Dec. 11, 1928.
E. W. LANGTON ET AL
1,695,113
SELF LOCKING COTTER PIN
Filed June 15, 1927
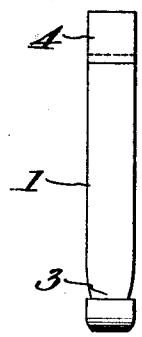
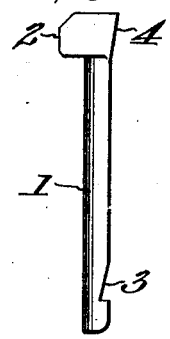
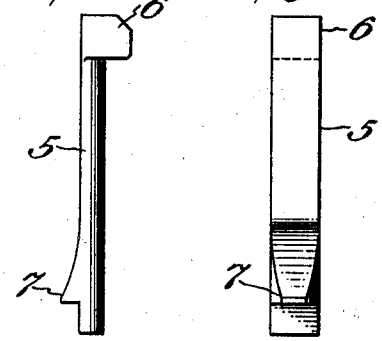
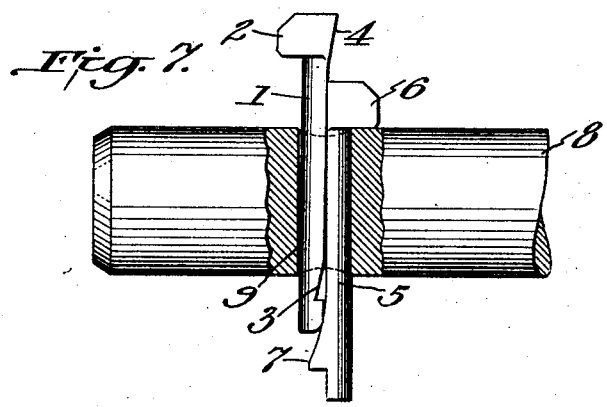
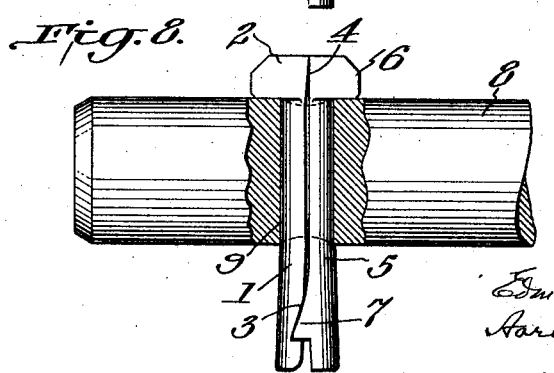
Inventors:
Edmond W. Langton
Aaron G. Dawson
by W. H. Finckel
Attorney.

Patented Dec. 11, 1928.

1,695,113

UNITED STATES PATENT OFFICE.

EDMOND W. LANGTON AND AARON G. DAWSON, OF RICHMOND, VIRGINIA.

SELF-LOCKING COTTER PIN.

Application filed June 15, 1927. Serial No. 198,940.

The object of this invention is to provide a cotter pin that automatically locks itself in place, thus obviating the necessity of manually bending one or both members to secure it, and also overcoming any carelessness or inattention on the part of the user to secure the cotter pin in place.

The invention consists of a cotter pin composed of two unlike but complemental parts, each part having a head at one end and a member at the opposite end that interlocks with the other and serves to spread the parts after passing through the hole in which placed, and one part at its head end having an incline that tends to spread the head ends and thus insure the interlocking of the parts automatically when one part is arranged in the hole and the other part driven in alongside it, as we will proceed now to explain more fully and finally claim.

In the accompanying drawings illustrating the invention, in the several figures of which like parts are similarly designated, Figure 1 is a front elevation, Fig. 2 a side elevation and Fig. 3 a plan view, looking from the bottom upwardly, of one part of the two-part cotter pin. Fig. 4 is a side elevation, Fig. 5 is a front elevation and Fig. 6 is a plan view, looking from the bottom upwardly, of the other part of the two-part cotter pin. Fig. 7 is an elevation, partly in section, illustrating the first steps in installing our two-part cotter pin. Fig. 8 is an elevation, partly in section, showing the two parts of the cotter pin driven home and as they will be used.

One part of the cotter pin, as shown in Figs. 1-3 and 7-8, comprises the shank 1 having the rearwardly extending head 2. The leading end of the shank 1 is notched, as at 3, and the face of the head 2 is inclined, as indicated at 4, so as to stand off from the straight line of the shank between the notch and the head so as to impart a wedge action when this part of the cotter pin is assembled in connection with the other part now to be described.

The other part of the two-part cotter pin, as shown in Figs. 4-6 and 7-8, comprises a shank 5 having a rearwardly extending head 6, and at its leading end the shank is provided with the inclined projection 7, which is adapted to engage with the notch 3 of the other part, and thereby in connection with the incline 4 lock the two parts in engagement, as shown in Fig. 8.

Fig. 7 and 8 illustrate the use of the cotter pin on a pin or key or other article, designated 8, having a through hole 9. Fig. 7 shows the cotter pin part illustrated in Figs. 4, 5 and 6 as inserted in the hole 9, while the cotter pin part shown in Figs. 1 to 3, is shown inserted in the hole, but with its descent arrested by contact with the projection 7. In such relation a hammer, or other tool or implement, is used on the head 2 to drive the notched part downwardly so as to cause the notched end to ride over the projection 7 and then slip back underneath the projection as indicated in Fig. 8 and lock the two parts together, with a sufficient spreading of the lower ends of the shanks of both parts to prevent accidental escape of the cotter pin. In the driving home of the notched part the incline 4 of its head will press against the head of the other part and thereby serve to crowd the two parts into engagement with one another and with the hole 9, as indicated in Fig. 8.

It is obvious that under the spreading action described, there is no possibility of lost motion under the head and the parts are firmly locked and cannot work themselves out independently or collectively. They can be removed only by using a chisel or other implement to pry apart the ends of the cotter pin or by destroying the cotter pin itself.

Variations in details of construction are permissible within the principle of the invention and the claims following.

What we claim is:

1. A self-locking cotter pin, for use with a part to be pinned having a hole, said pin composed of two complemental parts, one part having a shank terminating at one end in a head and having at its other and leading end a notch, and the other part having at one end a head and at its other and leading end an inclined projection extending toward the notch, the part having the inclined projection being inserted fully in the hole in the part to be pinned, and the part having the notch thereafter inserted in said hole with its notch facing the inclined projection on the other part and driven home, the notched part when so driven riding over the inclined projection and slipping back and underneath the inclined projection to effect an interlocking engagement of the two parts and spreading the leading ends of the two parts into fixed position in the hole.

2. A self-locking cotter pin, for use with a part to be pinned having a hole, said pin composed of two complemental parts, one part having a shank terminating at one end in a head provided with an inclined face and having at its other and leading end a notch, and the other part having at one end a head and at its other and leading end an inclined projection extending toward the notch, the part having the incline projection being inserted fully in the hole in the part to be pinned, and the part having the notch thereafter inserted in said hole with its notch facing the inclined projection on the other part and driven home, the notched part when so driven riding over the inclined projection and slipping back and underneath the inclined projection to effect an interlocking engagement of the two parts and spreading the leading ends of the two parts into fixed position in the hole, the inclined face of the head of the notched part pressing against the head of the other part and thereby serving to crowd the two parts into secure engagement with one another and with the hole.

In testimony whereof we have hereunto set our hands this 14th day of June, A. D. 1927.

EDMOND W. LANGTON.
AARON G. DAWSON.